United States Patent
Dultz et al.

(10) Patent No.: US 6,914,647 B1
(45) Date of Patent: Jul. 5, 2005

(54) ELECTRO-OPTICAL LIGHT MODULATOR

(75) Inventors: Wolfgang Dultz, Frankfurt am Main (DE); Leonid Beresnev, Columbia, MD (US); Wolfgang Haase, Reinheim (DE); Arkadii Onokhov, St. Petersburg (RU)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/856,108

(22) PCT Filed: Oct. 29, 1999

(86) PCT No.: PCT/EP99/08206
§ 371 (c)(1),
(2), (4) Date: Feb. 27, 2002

(87) PCT Pub. No.: WO00/29901
PCT Pub. Date: May 25, 2000

(30) Foreign Application Priority Data

Nov. 17, 1998 (DE) ......................................... 198 52 890

(51) Int. Cl.⁷ ............................................. G02F 1/1347

(52) U.S. Cl. ............................ 349/77; 349/75; 349/81

(58) Field of Search ............................ 349/81, 74, 75, 349/77

(56) References Cited

U.S. PATENT DOCUMENTS

| | | | | |
|---|---|---|---|---|
| 5,126,864 A | * | 6/1992 | Akiyama et al. | 349/75 |
| 5,168,381 A | * | 12/1992 | Walba | 349/77 |
| 5,326,498 A | * | 7/1994 | Kelly | 252/299.61 |
| 5,477,354 A | | 12/1995 | Schehrer | |
| 5,615,025 A | * | 3/1997 | Kaneko et al. | 349/74 |
| 5,729,307 A | * | 3/1998 | Koden et al. | 349/33 |
| 5,978,053 A | * | 11/1999 | Giles et al. | 349/17 |

FOREIGN PATENT DOCUMENTS

| | | |
|---|---|---|
| EP | 0 309 774 | 4/1989 |
| EP | 0 459 306 | 12/1991 |
| WO | WO 94/25893 | 11/1994 |
| WO | WO 96/10210 | 9/1995 |

OTHER PUBLICATIONS

Beresnev, Leonid et al., "Ferroelectric liquid crystals: Development of materials and fast electrooptical elements for non-display applications", Optical Materials, NL, Elsevier Science Publishers, Amsterdam, vol. 9, No. 1–4, Jan. 1, 1998, pp. 201–211.

Wand, M.D. et al., "An easily aligned deformable helix ferroelectric liquid crystal mixture and its use in devices", Liquid Crystal Materials, Devices and Applications, Proceedings of the SPIE—The International Society for Optical Engineering, San Jose, CA, USA, vol. 1665, Feb. 11–13, 1993, pp. 176–183.

(Continued)

*Primary Examiner*—Kenneth Parker
(74) *Attorney, Agent, or Firm*—Kenyon & Kenyon

(57) ABSTRACT

An electrically drivable light modulator having liquid crystal layers, which are disposed one behind the other and are enclosed between transparent plates having a surface anisotropy that orients the molecules of the liquid crystals and having electrodes for generating an electric field in the liquid crystals, at least two layers of helical, smectic, ferroelectric liquid crystals are situated one behind the other in the path of rays of a light beam to be modulated. The directions of the fast and slow axes of the individual layers are rotated relatively to each other so that the polarization of the light beam is the same upstream and downstream from the modulator. An adaptive, optical device has a field of light modulators configured in a raster-type array, in which the modulators are situated in the path of rays of the device, each individual light modulator being able to be driven to compensate for unsharpness occurring on a point-by-point basis in an image to be processed.

23 Claims, 1 Drawing Sheet

OTHER PUBLICATIONS

Love, et al., "Polarization Insensitive 127 Segment Liquid Crystal Wavefront Corrector", Adaptive Optics, OSA Technical Digest Series, Washington, D.C., vol. 13, 1996, pp. 288–290.

Eschler, J. et al., "Fast adaptive lens based on deformed helical ferroelectric liquid crystal", International Ferroelectric Liquid Crystal Conference (FLC 95), Cambridge, UK, vol. 181, No. 1–4, Jul. 23–27, 1995, pp. 21–28.

* cited by examiner

ELECTRO-OPTICAL LIGHT MODULATOR

FIELD OF THE INVENTION

The present invention relates to an electrically drivable light modulator having liquid crystal layers, which are disposed one behind the other and are enclosed between transparent plates having a surface anisotropy that orients the molecules of the liquid crystals and having electrodes for generating an electric field in the liquid crystals.

BACKGROUND INFORMATION

Electrically drivable light modulators may be required for correcting the phases of light in a great variety of optical devices. Especially in the field of adaptive optics, efforts are intensifying to find ways to correct local unsharpness in the object image of a telescope or a camera, caused, for example, by atmospheric effects or thermal stresses in the equipment. Especially in connection with rapid digital image processing technology, ways are evolving to correct images that are so distorted. The image is corrected, even during observation, by an electronically drivable raster of optically active elements that is introduced into the optical path of rays of the object image. This leads one to imagine photographic and observational equipment, which delivers a sharp image even in the presence of strong disturbances.

Due to their electro-optical properties, liquid crystals can be used to control the phase of a light wave propagating through them, in that the refractive index of a layer of liquid crystals is influenced by an electric field. The principal electro-optical effects in liquid crystals alter both the birefringence as well as the orientation of the indicatrix of the refractive index of the liquid crystal. This is undesirable for most applications, because not only does the anisotropic character of the liquid crystals produce a phase shift as it passes through the liquid crystal, but it changes the polarization as well. For that reason, only polarized light can be handled using liquid crystals of this kind. However, wavefront variations caused by phase lag ought to be possible, independently of polarization, for the above mentioned applications.

When nematic liquid crystals are used, the phase of a light beam can be changed without affecting the polarization of the light. Here as well, however, the light must be linearly polarized in parallel to the director of the oriented liquid crystal molecules. In addition, the reaction rate of such cells is too slow for applications in image-processing devices.

Ferroelectric liquid crystals (FLC) can be driven in a sufficiently short operation time. However, potential applications for ordinary ferroelectric liquid crystals are very limited due to the small phase changes that are attainable with. At cell thicknesses of 10 $\mu$m, phase shifts of merely about ¹⁄₁₀ of the wavelength of visible light are attained. However, one should aspire to phase shifts of one complete wavelength or more in order to perform all necessary phase corrections.

European Patent Application No. 0 309 774 discusses a liquid crystal cell which employs the DHF effect (deformation of the helix structure in the electric field) that occurs in FLCs, for continuous phase control and for gray scale representation. The optical phase control is based on a pronounced change in the average refractive index of the liquid crystal resulting from an applied electric field. The change in the birefringence of the deformed helix structure can reach d(n) =5%; the average refractive anisotropy <dn>= 15%. Due to the optical properties of the helical structure of thereby employed chiral smectic liquid crystal in the electric field, the change in the birefringence is associated with marked changes in the orientation of the average optical indicatrix. This means that, after propagating through the liquid crystal, the light is in a polarization state which is heavily dependent upon the polarization state upon entry. This dependence precludes the use of the described cell for the required purposes.

The reference of Love, Restaino, Carreras, Loos, Morrison, Baur and Kopp: "Polarization Insensitive 127-Segment Liquid Crystal Wavefront Corrector", Adaptive Optics, vol. 13, pp. 228–290, Optical Society of America, Washington D.C., 1996, discusses an electro-optically functioning modulator for controlling the phase of unpolarized light is introduced that contains two liquid crystal layers of the nematic type, which are disposed one behind the other. As apparently discussed in the reference, the two nematic layers are situated such that the directors of the liquid crystals are disposed orthogonally to one another in the field-free state. However, as already mentioned above, the cell may be much too slow for the purpose aspired to.

SUMMARY OF THE INVENTION

The exemplary embodiment of the present invention is directed to providing an electrically drivable light modulator, whose switching time is on the order of 1060–460 seconds or less, given a maximum phase shift of over 2̀0, and which can steplessly vary the phase of an arbitrarily polarized light beam, without altering its polarization state, and which is suited for fabricating highly resolving, adaptive optical devices, i.e., that is small, light, and low-loss.

An exemplary embodiment of the present invention provides that at least two layers of helical, smectic, ferroelectric liquid crystals, whose fast and slow optical axes, respectively, are disposed in parallel with the layer in question, and whose average optical anisotropy can be influenced by the action of the electric field, are situated one behind the other in the path of rays of a light beam to be modulated, and in that the directions of the fast and slow axes, respectively, of the individual layers are rotated relatively to each other in such a way that the polarization of-the light beam is the same upstream and downstream from the modulator.

In this context, the "slow" axis corresponds to that direction in which the refractive index is the greatest. The "fast" axis is that direction in which the refractive index is the smallest. Thus, the phase of a light beam that is polarized in the slow direction is delayed substantially, and the phase of a light beam that is polarized in the fast direction is delayed to a lesser extent. Thus, in the case of arbitrarily polarized light, the anisotropy of the refractive indices alters its polarization state as it passes through the liquid crystal layers. The rotation of the individual layers relatively to one another is exactly calculated to again effect a reversal of the mentioned change in the polarization state of the subsequent layers.

In a simple case, the light modulator is so conceived that two liquid crystal layers are situated one behind the other such that the slow optical axis of the first layer is normal to the slow optical axis of the second layer, the fast optical axis of the first layer is normal to fast optical axis of the second layer, and the orientation of the slow and fast optical axes of the two layers in relation to one another is retained at all times during application and variation of the control voltage.

The fast and slow axes of the two layers intersecting at right angles only just compensates for the variations in the birefringence and in the orientation of the indicatrix ellipsoids of the refractive indices.

To reduce the unit volume, provision can be made for the liquid crystal layers to be enclosed between two transparent plates, on whose electrodes a control voltage can be applied to generate an electric field.

To reduce the outlay for assembling the light modulator and to facilitate mass production, provision can alternatively be made for each of the liquid crystal layers to be enclosed between two transparent plates, on whose electrodes a control voltage can be applied in each case to generate an electric field.

To manufacture the light modulator in accordance with the present invention, the required number of individual cells, fabricated in this manner, is arranged one behind the other.

When using comparable layer thicknesses and materials for the layers, it is provided that the liquid crystal layers exhibit the same average refractive indices, have the same thickness, and be able to synchronously receive the same control voltages.

When using different layer thicknesses or different materials for the individual layers, it is provided that the ratio of the control voltages to one another be adjustable to compensate for the changes in the polarization of a light beam passing through. In this manner, a crossing over of the main refractive directions can also be achieved in the case of asymmetrically constructed cells.

Considerable outlay is required to manufacture the liquid crystal cells; large quantities do not meet the requirements for accuracy and must, therefore, be sorted out and reintroduced to the production process. To simplify production and reduce associated costs, it is provided that the control voltages be adjustable for the individual liquid crystal layers to compensate for manufacturing tolerances.

The light modulator in accordance with the exemplary embodiment of the present invention is believed to work particularly well in the range of visible light with a smectic liquid crystal mixture FLC-472/FLC-247 of 60% by weight of phenyl pyrimidine and 40% by weight of an achiral, smectic A or C matrix having a chiral doping on the basis of disubstituted ether of bis-terphenyl dicarboxylic acid. This doping induces a spontaneous polarization of about 160 nC/cm2 in the matrix having a helical structure of the winding period of about 0.3 μm in the chiral smectic phase. An operating voltage of OV to 4V already produces a smectic deflection angle of 0° to ±22.5° at a response time 122 of 150 μs. Thus, the modulation depth between two crossed layers amounts up to 100%. In response to the operating voltage mentioned above, the average refractive index already changes by amounts of up to 5%. To obtain a phase difference on the order of the wavelength of the light to be controlled, a summed layer thickness of 10 μm suffices. This layer thickness is the sum of the thicknesses of the individual layers.

When cameras or telescopes are used to observe objects within or right through the earth's atmosphere, local unsharpness occurs in the object image which is attributable to atmospheric disturbances. To correct this local unsharpness, an adaptive optical device is proposed which contains a field of light modulators, in a raster-type array, of the type described by the present invention. The field is situated in the path of rays of the device, each individual light modulator being able to be driven to compensate for unsharpness occurring on a point-by-point basis, of an image to be processed.

In this context, to reduce the outlay for assembly, the light modulators can be mounted on a common substrate.

The device is positioned in the ray path of the observational equipment in question, such as a camera or telescope. The object image picked up by the observational equipment is fed to an image-analysis device, which determines the unsharpness in the image and, to compensate for the same, drives the modulator field accordingly.

DETAILED DESCRIPTION

Figure 1:
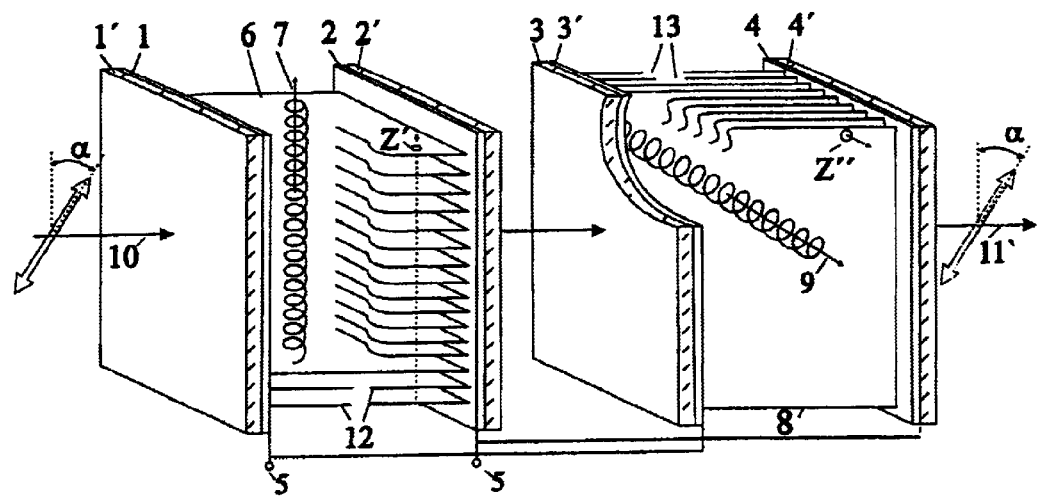
FIG. 1 shows the configuration of the liquid crystal cells for the modulator.

FIG. 1 shows an exemplary embodiment of the present invention having two liquid crystal layers 6 and 9 disposed one behind the other in the ray trajectory of a light beam 10 to be modulated. The polarization direction of incident light beam 10 and of emergent light beam 11 is marked in each case by a double arrow. In the example, the polarization direction of incident light beam 10 is tilted by angle 6 from the perpendicular.

First liquid crystal layer 6 is situated between two transparent electrodes 1 and 2, which are mounted on two transparent plates 1' and 2'. Smectic layers 12 form displacement domains, along which the molecules of the liquid crystal arrange themselves. The molecules of the liquid crystal are twisted by an angle from layer to layer, so that the result is a helical structure whose axis 7 runs in the direction of normals z' to smectic layers 12. Second liquid crystal layer 8 is disposed between transparent electrodes 3 and 4, which are mounted, in turn, on transparent plates 3' and 4'. The direction of normal z" of smectic layers 13 of 122 second liquid crystal layer 8 and the axis of helix 9 are twisted by 90 E from direction of normal z' and helical axis 7 of first layer 6.

Two liquid crystal layers 6 and 8, crossed in this manner, change the polarization state of a transmitted light beam 10. The pure phase modulation of the two liquid crystal layers is induced by the field-dependent, average refractive index. The birefringence and orientation effects of the indicatrix in the electric fields produced by the application of a voltage to connection terminals 5 are compensated in all field strengths.

Figure 2:
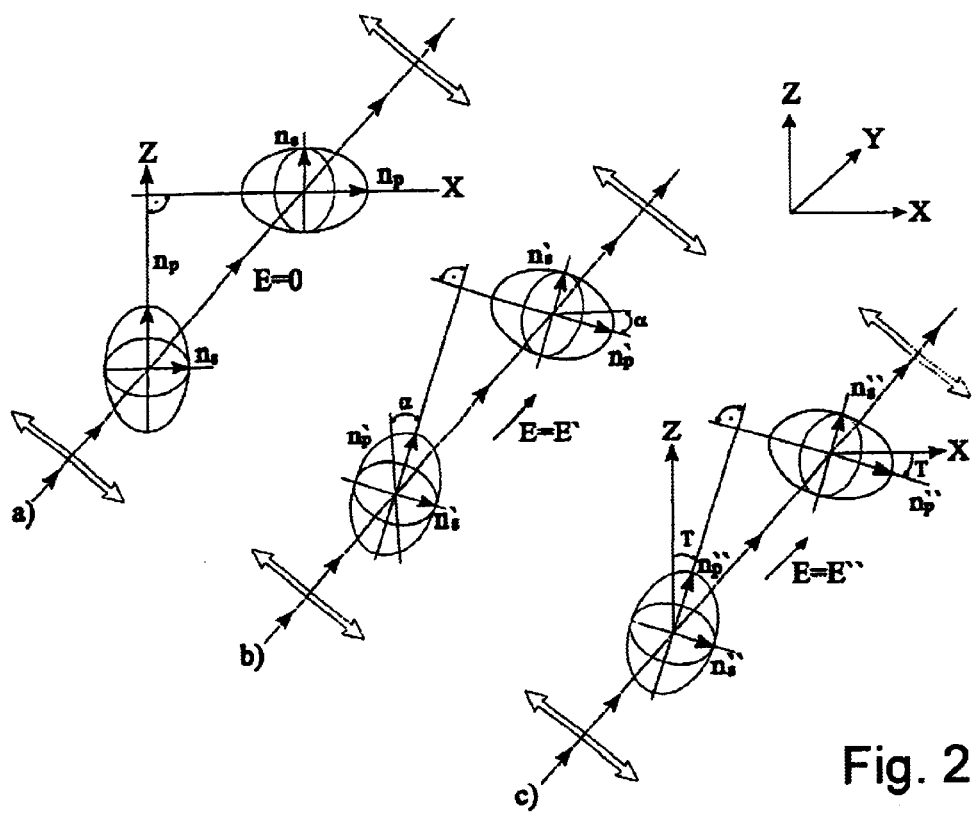
FIG. 2a shows a schematic diagram of the refractive index indicatrices for an operating state where no voltage is applied.
FIG. 2b shows a schematic diagram of the refractive index indicatrices for an operating state where a small voltage is applied.
FIG. 2c shows a schematic diagram of the refractive index indicatrices for an operating state where a voltage that is just below that voltage at which the helical structure of the liquid crystal disappears is applied.

FIG. 2 shows effects of an electric field E of variable strength 0, E', E', on refractive indices n20s20 and n20p20 of liquid crystal layers 6 and 8. The x- and z-axis of the illustrated coordinate system are disposed in parallel to the plane of the liquid crystal layers. In addition, the z-axis is situated in parallel to the direction of normal z' of first liquid crystal 6. The y-axis points in the direction of propagation of incident light beam 10. In FIG. 2a, no voltage is applied. The slow axis having refractive index n20p20 of the first liquid crystal layer points in the direction of the z-axis, while the slow axis having refractive index n20p20 of the second liquid crystal layer is oriented orthogonally to the z-axis. The polarization state of the incident light is retained upon passing through both layers 6 and 8.

In FIG. 2b, a small voltage is applied which is less than that voltage at which the helical structure disappears. The slow optical axes having refractive indices n20p20', as well as the fast axes having refractive indices n20s20' of both layers 6 and 8 reorient themselves and are rotated by angle Ó. The right angles between the axes are retained. The 122 refractive index n20p20' increases in the slow axes with rising field strength E', while refractive index n20s20' decreases in the slow axes. The optical path of the transmitted light is changed by field strength E' and, consequently, is shifted in phase. The greatest change in the optical path occurs at a voltage that is just below that voltage at which the helical structure of the liquid crystal disappears. This state is shown in FIG. 2c. In the liquid crystals, which at this point are no longer wound, the index ellipsoid of the refractive indices is characterized by molecular refractive indices n20p20" and n20s20". The slow axes having refractive indices n20p20" are tilted in the two layers 6 and 8 by the molecular tilt angle T, which corresponds to the angle between smectic layers 12 and 13 and helical axes 7 and 9. In this case, as well, the axes remain crossed at a right angle. The phase displacement is, therefore, independent of the polarization of the light over the entire operating range. As a result, it is possible to control unpolarized light as well.

What is claimed is:

1. An electrically drivable light modulator comprising:
   at least two liquid crystal layers for enclosing between at least two transparent plates having a surface anisotropy for orienting molecules of the at least two liquid crystal layers and having electrodes for generating an electric field in the at least two liquid crystal layers;
   wherein:
      the at least two liquid crystal layers include helical, smectic, ferroelectric liquid crystals, whose fast optical axes and slow optical axes, respectively, are disposed in parallel with a respective one of the at least two liquid crystal layers, and whose average optical anisotropy is influenceable by an action of the electric field;
      the at least two liquid crystal layers are situated one behind another in a path of rays of a light beam to be modulated; and
      directions of the fast optical axes and slow optical axes, respectively, of the at least two liquid crystal layers are rotated relative to one another so as to maintain that a polarization of the light beam upstream of the modulator is the same as a polarization of the light beam downstream of the modulator.

2. An electrically drivable light modulator comprising:
   at least two liquid crystal layers for enclosing between at least two transparent plates having a surface anisotropy for orienting molecules of the at least two liquid crystal layers and having electrodes for generating an electric field in the at least two liquid crystal layers;
   wherein:
      the at least two liquid crystal layers include helical, smectic ferroelectric liquid crystals, whose fast optical axes and slow optical axes, respectively, are disposed in parallel with a respective one of the at least two liquid crystal layers, and whose average optical anisotropy is influenceable by an action of the electric field;
      the at least two liquid crystal layers are situated one behind another for being in a path of rays of a light beam to be modulated; and
      directions of the fast optical axes and slow optical axes, respectively, of the at least two liquid crystal layers are rotated relative to one another so that a polarization upstream of the light beam is the same as a polarization downstream of the light beam;
   wherein the at least two liquid crystal layers include a first layer and a second layer and are situated one behind another so that:
      a first slow optical axis of the first layer is normal to a second slow optical axis of the second layer;
      a first fast optical axis of the first layer is normal to a second fast optical axis of the second layer; and
      an orientation of the first slow optical axis and the first fast optical axis of the first layer and of the second slow optical axis and the second fast optical axis of the second layer in relation to one another is retained at all times when a control voltage is applied and varied.

3. The electrically drivable light modulator of claim 1, wherein the at least two liquid crystal layers are enclosed between the at least two transparent plates, and a control voltage is applied to the electrodes for generating the electric field.

4. The electrically drivable light modulator of claim 1, wherein the at least two transparent plates include a plurality of transparent plates, and each of the at least two liquid crystal layers is enclosed between two of the plurality of transparent plates, a control voltage being appliable to the electrodes for generating a respective electric field in each case.

5. The electrically drivable light modulator of claim 1, wherein the at least two liquid crystal layers exhibit a same average refractive index, have a same thickness and are able to receive synchronously a same control voltage.

6. The electrically drivable light modulator of claim 4, wherein a ratio of control voltages of the electrodes is adjustable for compensating for a change in the polarization of a light beam passing through the at least two liquid crystal layers.

7. The electrically drivable light modulator of claim 1, wherein control voltages for each of the at least two liquid crystal layers is adjustable for compensating for a manufacturing tolerance.

8. The electrically drivable light modulator of claim 1, wherein the at least two liquid crystal layers include a smectic liquid crystal mixture of 60% by weight of phenyl pyrimidine and 40% by weight of at least one of an achiral, smectic A or C matrix having a chiral doping on a basis of a disubstituted ether of bis-terphenyl dicarboxylic acid.

9. The electrically drivable light modulator of claim 1, wherein the at least two liquid crystal layers include 60% by weight of phenyl pyrimidine and 40% by weight of an achiral, smectic A matrix having a chiral doping on a basis of a disubstituted ether of bis-terphenyl dicarboxylic acid.

10. The electrically drivable light modulator of claim 1, wherein the at least two liquid crystal layers include 60% by weight of phenyl pyrimidine and 40% by weight of an achiral, smectic C matrix having a chiral doping on a basis of a disubstituted ether of bis-terphenyl dicarboxylic acid.

11. An adaptive optical device comprising:
    a field of light modulators being configured in a raster-type array and being for situating in a path of rays, each of the light modulators being drivable for compensating for unsharpness occurring on a point-by-point basis of an image to be processed, and each of the light modulators including:
       at least two liquid crystal layers for enclosing between at least two transparent plates having a surface anisotropy for orienting molecules of the at least two liquid crystal layers and having electrodes for generating an electric field in the at least two liquid crystal layers, wherein:

the at least two liquid crystal layers include helical, smectic ferroelectric liquid crystals, whose fast optical axes and slow optical axes, respectively, are disposed in parallel with a respective one of the at least two liquid crystal layers, and whose average optical anisotropy is influenceable by an action of the electric field;

the at least two liquid crystal layers are situated one behind another for being in a path of rays of a light beam to be modulated; and directions of the fast optical axes and slow optical axes, respectively, of the at least two liquid crystal layers are rotated relative to one another so as to maintain that a polarization of the light beam upstream of the modulator is the same as a polarization of the light beam downstream of the modulator.

12. The adaptive optical device of claim 11, further comprising a common substrate for mounting the field of light modulators.

13. The adaptive optical device of claim 11, wherein a digital camera is arranged upstream from an image sensor for picking up and feeding an image to an image-analysis device for determining a point-for-point unsharpness in the image, and the adaptive optical device is drivable by the image-analysis device for compensating for the point-for-point unsharpness.

14. The adaptive optical device of claim 11, wherein an image observable by an optical observational device is feedable in parallel to an image-analysis device for determining a point-for-point unsharpness in the image, and the adaptive optical device is drivable by the image-analysis device for compensating for the point-for-point unsharpness.

15. The adaptive optical device of claim 11, wherein an image observable by a camera is feedable to an image-analysis device for determining a point-for-point unsharpness in the image, and the adaptive optical device is drivable by the image-analysis device for compensating for the point-for-point unsharpness.

16. The electrically drivable light modulator of claim 2, wherein the at least two liquid crystal layers are enclosed between the at least two transparent plates, and a control voltage is applied to the electrodes for generating the electric field.

17. The electrically drivable light modulator of claim 2, wherein the at least two transparent plates include a plurality of transparent plates, and each of the at least two liquid crystal layers is enclosed between two of the plurality of transparent plates, a control voltage being appliable to the electrodes for generating a respective electric field in each case.

18. The electrically drivable light modulator of claim 2, wherein the at least two liquid crystal layers exhibit a same average refractive index, have a same thickness and are able to receive synchronously a same control voltage.

19. The electrically drivable light modulator of claim 17, wherein a ratio of control voltages of the electrodes is adjustable for compensating for a change in the polarization of a light beam passing through the at least two liquid crystal layers.

20. The electrically drivable light modulator of claim 2, wherein control voltages for each of the at least two liquid crystal layers is adjustable for compensating for a manufacturing tolerance.

21. The electrically drivable light modulator of claim 2, wherein the at least two liquid crystal layers include a smectic liquid crystal mixture of 60% by weight of phenyl pyrimidine and 40% by weight of at least one of an achiral, smectic A and C matrix having a chiral doping on a basis of a disubstituted ether of bis-terphenyl dicarboxylic acid.

22. The electrically drivable light modulator of claim 2, wherein the at least two liquid crystal layers include 60% by weight of phenyl pyrimidine and 40% by weight of an achiral, smectic A matrix having a chiral doping on a basis of a disubstituted ether of bis-terphenyl dicarboxylic acid.

23. The electrically drivable light modulator of claim 2, wherein the at least two liquid crystal layers include 60% by weight of phenyl pyrimidine and 40% by weight of an achiral, smectic C matrix having a chiral doping on a basis of a disubstituted ether of bis-terphenyl dicarboxylic acid.

* * * * *